(12) United States Patent
Uryu

(10) Patent No.: US 8,897,967 B2
(45) Date of Patent: Nov. 25, 2014

(54) ELECTRIC POWER STEERING APPARATUS

(71) Applicant: Denso Corporation, Kariya, Aichi-pref. (JP)

(72) Inventor: Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 155 days.

(21) Appl. No.: 13/738,399

(22) Filed: Jan. 10, 2013

(65) Prior Publication Data

US 2013/0179039 A1 Jul. 11, 2013

(30) Foreign Application Priority Data

Jan. 10, 2012 (JP) ................................ 2012-002194

(51) Int. Cl.
 *B62D 5/04* (2006.01)
 *B62D 6/00* (2006.01)

(52) U.S. Cl.
 CPC ............ *B62D 5/0484* (2013.01); *B62D 5/0463* (2013.01); *B62D 5/0487* (2013.01); *B62D 6/00* (2013.01)
 USPC .................................. 701/43; 701/41; 701/42

(58) Field of Classification Search
 CPC ... B62D 5/0484; B62D 5/0487; B62D 5/0463
 USPC ............................................... 701/41, 42, 43
 See application file for complete search history.

(56) References Cited

U.S. PATENT DOCUMENTS

| 5,927,430 | A | * | 7/1999 | Mukai et al. | 180/446 |
| 6,158,553 | A | * | 12/2000 | Oshima et al. | 187/293 |
| 6,523,637 | B1 | * | 2/2003 | Nakano et al. | 180/402 |
| 2003/0200018 | A1 | * | 10/2003 | Arimura | 701/41 |
| 2011/0156629 | A1 | | 6/2011 | Satou et al. | |
| 2013/0066523 | A1 | * | 3/2013 | Iwamoto et al. | 701/41 |

FOREIGN PATENT DOCUMENTS

| JP | 01-215667 | 8/1989 |
| JP | 2000-004600 | 1/2000 |
| JP | 2004-129402 | 4/2004 |
| JP | 2005-304119 | 10/2005 |
| JP | 2009-248857 | 10/2009 |
| JP | 2011-131860 | 7/2011 |

\* cited by examiner

*Primary Examiner* — Khoi Tran
*Assistant Examiner* — Ryan Rink
(74) *Attorney, Agent, or Firm* — Nixon & Vanderhye PC

(57) ABSTRACT

The electric power steering apparatus has a plurality of power systems each including an inverter apparatus provided corresponding to a plurality of wiring sets of a motor thereof. The control section calculates the assist current to be supplied to the motor using a one power system failure-state map when the inverter apparatus or its corresponding wiring set of one of the power systems fails, or using a vehicle speed detection failure-state map when there is a failure in detecting the vehicle speed. The assist current limit value in the one power system failure-state map and the assist current limit value in the vehicle speed detection failure-state map are set to the same value.

7 Claims, 16 Drawing Sheets

PRIOR ART

ELECTRIC POWER STEERING APPARATUS

This application claims priority to Japanese Patent Application No. 2012-2194 filed on Jan. 10, 2012, the entire contents of which are hereby incorporated by reference.

BACKGROUND OF THE INVENTION

1. Field of the Invention

The present invention relates to an electric power steering apparatus for assisting a steering torque generated by a vehicle driver's steering operation.

2. Description of Related Art

There is known an electric power steering apparatus which includes a plurality of power converters provided corresponding to a plurality of winding sets of a motor, and is configured to continue to supply power to the motor even when one of the power converters or the corresponding winding set fails by using the remaining normal power converter(s) and winding set(s). For example, the electric power steering apparatus described in Japanese Patent Application Laid-open No. 2011-131860 is configured to, upon detecting a failure in one of power converters or the corresponding winding set, seta current limit value of the remaining normal power converter(s) to a value equal to a current limit value having been set for the power converter(s) before detecting the failure. For example, in a case where the electric power steering apparatus includes two power converters, and one of the two power converters fails, the electric power steering apparatus continues to operate while setting the current limit value of the remaining one normal power converter to a half of the sum of the current limit values having been set for the two power converters before the occurrence of the failure.

In this case, since the sum of the current limit values after the occurrence of the failure becomes half of that before the occurrence of the failure, the vehicle driver can notice a change in the force necessary to operate the steering wheel, and accordingly notice occurrence of some failure. In addition, the electric load of the normal power converter can be prevented from becoming excessive.

Incidentally, an assist torque required to an electric power steering apparatus varies depending on the speed of a vehicle. That is, when the vehicle is running at a low speed, it is preferable to increase the assist torque so that the steering torque to be generated by the vehicle driver becomes smaller and accordingly the vehicle driver can maneuver the vehicle easily. On the other hand, when the vehicle is running at a high speed, it is preferable to reduce the assist torque so that the steering torque to be generated by the vehicle driver becomes larger in view of ensuring the straight-running stability of the vehicle. Hence, generally, conventional electric power steering apparatuses are configured to perform a vehicle speed responsive control in a normal state, in which a relationship between the assist current (the motor current) and the steering torque is determined in accordance with the vehicle speed. However, the electric power steering apparatus described in the above patent document cannot operate taking into account the vehicle speed when a failure occurs in any one of the power converters or the winding sets of the motor. Accordingly, the electric power steering apparatus described in the above patent document cannot operate optimally when a failure occurs in any one of the power converters or the windings sets of the motor.

SUMMARY

An exemplary embodiment provides an electric power steering apparatus including:

a vehicle speed sensor for detecting a vehicle speed of a vehicle;

a torque sensor for detecting a steering torque generated by a steering wheel operated by a vehicle driver;

a motor having a plurality of wiring sets and generating an output torque when supplied with electric power;

a reduction gear for reducing a rotational speed of the motor to amplify the output torque of the motor, and transmitting the amplified output torque to a steering shaft of the vehicle as an assist torque; and a control section for controlling rotation of the motor, wherein the control section includes:

a plurality of power systems provided corresponding to the plurality of the winding sets of the motor, each of the power systems including a power converter apparatus for supplying power to a corresponding one of the winding sets;

a drive circuit for driving the power converter apparatus of each of the plurality of the power systems to supply an assist current to the motor in accordance with an assist current command value;

a failure detection means for, upon detecting a failure in the power converter apparatus or the winding set of any one of the power systems, identifying the one of the power systems as a failed power system;

a power supply stopping means for stopping supply of power to the power converter apparatus of the failed power system identified by the failure detection means;

a map storage means for storing a normal-state vehicle speed responsive map defining, as a T-I characteristic, a relationship between the steering torque and the assist torque, the normal-state vehicle speed responsive map being for use when the vehicle speed is normally detected using the vehicle speed sensor;

an assist current calculation means for calculating an assist current calculation value based on the steering torque detected by the torque sensor and the vehicle speed detected by the vehicle speed sensor, the assist current calculation means being configured to, when one of the power systems is identified as the failed power system by the failure detection means, set a first current limit value as a limit value of the assist current in a one power system failure-state map to be used for driving the power converter apparatus of each of the remaining normal power systems equal to a limit value of the assist current in a vehicle speed detection failure-state map to be used when there is a failure in detecting the vehicle speed, the vehicle speed detection failure-state map defining the T-I characteristic irrespective of the vehicle speed; and an assist current command means for determining the assist current command value to be outputted to the drive circuit based on the assist current calculation value calculated by the assist current calculation means.

According to the exemplary embodiment, there is provided an electric power steering apparatus capable of providing a necessary assist torque even when the power converter apparatus of any of a plurality of power systems thereof or any one of the wiring sets of a motor thereof fails.

Other advantages and features of the invention will become apparent from the following description including the drawings and claims.

PREFERRED EMBODIMENTS OF THE INVENTION

Figure 1:
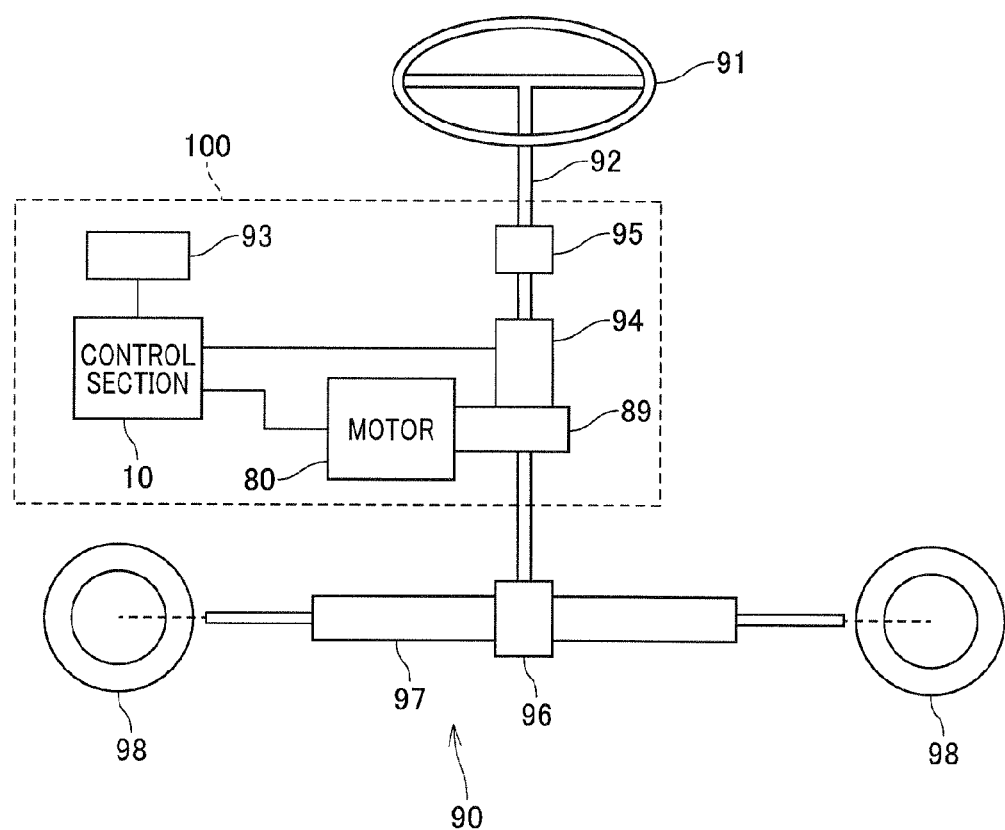
FIG. 1 is a diagram schematically showing an overall structure of a vehicle steering system including an electric power steering apparatus according to a first embodiment of the invention.

In the following embodiments, the same or equivalent components are designated by the same reference numerals or characters.

First Embodiment

An electric power steering apparatus 100 according to a first embodiment of the invention is described with reference to FIGS. 1 to 4.

As shown in FIG. 1, the electric power steering apparatus 100 is used for a steering system 90 of a vehicle. The steering system 90 includes a steering wheel 91, a steering shaft 92, a pinion gear 96, a rack gear 97 and right and left tires 98. The steering wheel 91 is operated by a vehicle driver. The steering shaft 92 is coupled to the steering wheel 91, and rotates together with the steering wheel 91. The pinion gear 96 is provided in the tip of the steering shaft 92 on the side opposite to the steering wheel 91 so as to mesh with the rack gear 97. The tires 98 are connected to both ends of the rack gear 97 through tire rods or the like. A rotational movement of the steering shaft 92 is converted to a linear movement through the pinion gear 96 and the rack gear 97 so that the right and left tires 98 are steered in accordance with a linear displacement of the rack gear 97.

Figure 2:
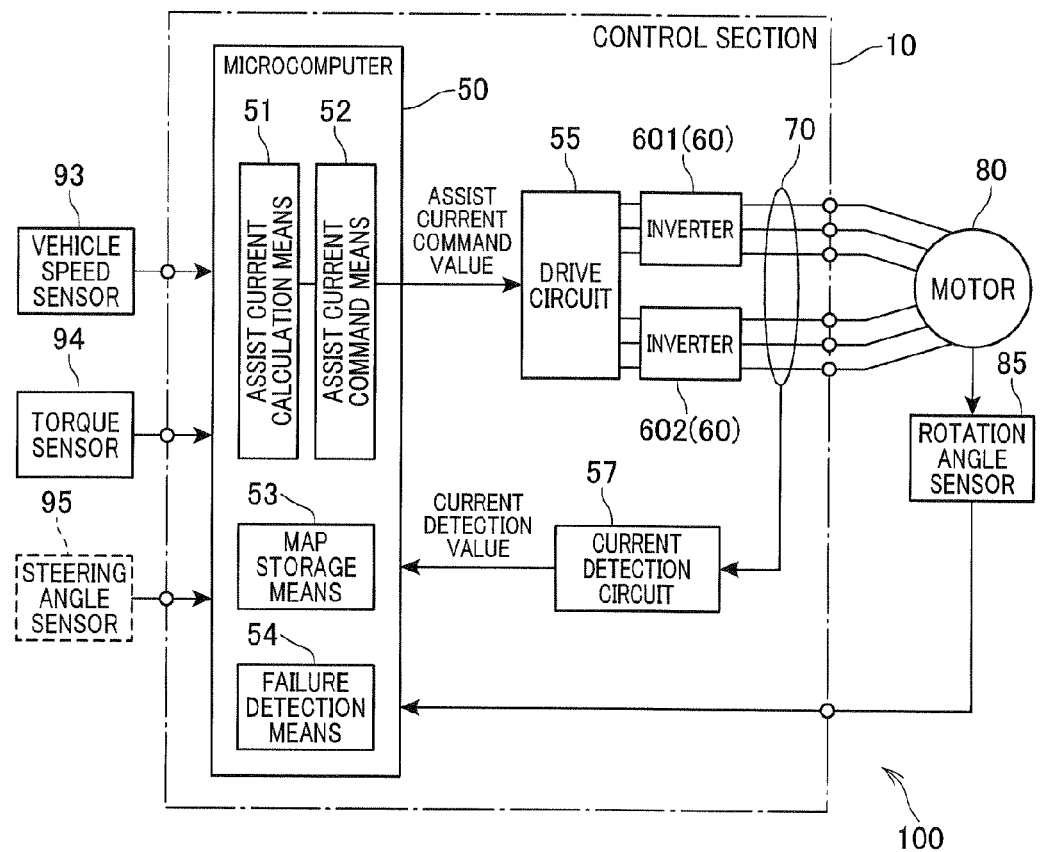
FIG. 2 is a block diagram showing an electrical structure of the electric power steering apparatus according to the first embodiment of the invention.

As shown in FIGS. 1 and 2, the electric power steering apparatus 100 includes a control section 10, a motor 80, a reduction gear 89, a vehicle speed sensor 93 and a torque sensor 94. The control section 10, which includes a microcomputer 50, a drive circuit 55, an inverter apparatus 60 as a power converter apparatus and a current detection section 70, controls electric power supplied to the motor 80. In this embodiment, the motor 80 is a three-phase brushless motor which rotates the reduction gear 89 in the normal or reverse direction when supplied with electric power. The reduction gear 89 reduces the rotational speed of the motor 80 while amplifying the output torque of the motor 80, and transmits the amplified torque to the steering shaft 92 as an assist torque. Accordingly, the steering shaft 92 is rotated by an assisted steering torque which is the sum of the steering torque generated by the steering wheel 91 operated by the vehicle driver and the assist torque generated by the electric power steering apparatus 100.

The microcomputer 50 calculates various values necessary for the steering control based on detection signals outputted from the vehicle speed sensor 93, the torque sensor 94 and a steering angle sensor 95 (to be described later). The vehicle speed sensor 93 detects the vehicle speed and transmits a vehicle speed signal to the microcomputer 50 through a communication means such as CAN (Controller Area Network). The torque sensor 94 is provided in the steering shaft 92 to detect the steering torque generated by the vehicle driver. The steering angle sensor 95 is provided in the steering shaft 92 to detect the steering angle of the steering wheel 91. The steering angle sensor 95 may be omitted. The motor 80 is provided with a rotation angle sensor 85 such as a resolver or a magnetoresistance element for detecting the rotation angle of the motor 90. The rotation angle sensor 8 transmits a rotation angle signal to the microcomputer 50.

The microcomputer 50 includes an assist current calculation means 51, an assist current command means 52, a map storage means 53 and a failure detection means 54. These means are described later. The drive circuit 55 drives the inverter apparatus 60 in accordance with an assist current command value received from the microcomputer 50. A current detection circuit 57 acquires current detection values of the respective phases of the motor 80 from the current detection section 70, and feeds back them to the microcomputer 50. The microcomputer 50 performs feedback control in accordance with the current detection values received from the current detection circuit 57 and the rotation angle signal received from the rotation angle sensor 85, etc.

Figure 3:
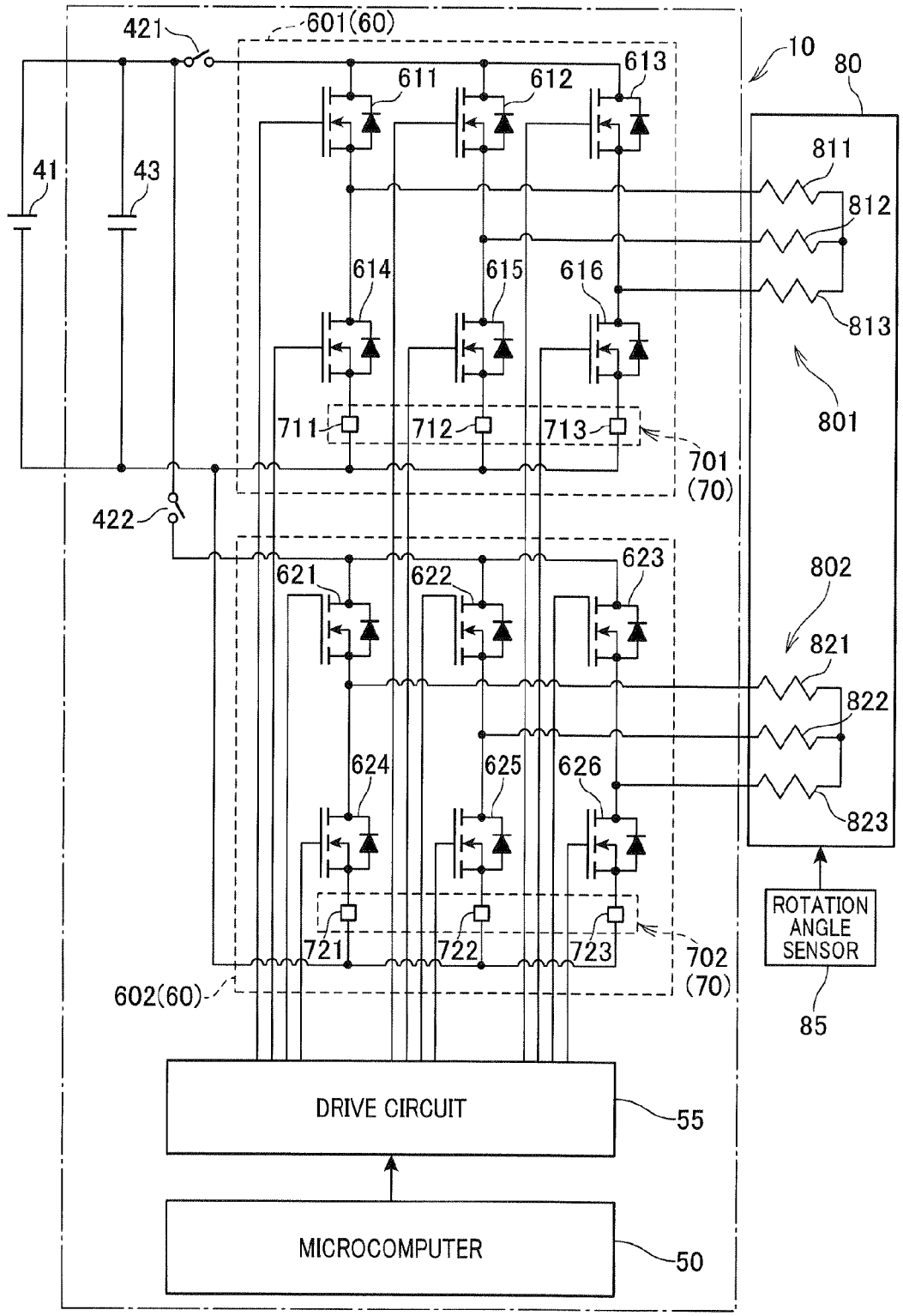
FIG. 3 is a circuit diagram of power converter apparatuses and a motor included in the electric power steering apparatus according to the first embodiment of the invention.

The control section 10 includes a plurality of inverters (two inverters 601 and 602 in this embodiment) which constitute the inverter apparatus 60. As shown in FIG. 3, the inverters 601 and 602 are provided respectively for two three-phase winding sets, a first winding set 801 and a second winding set 802 of the motor 80. The first winding set 801 is constituted of a U-phase winding 811, a V-phase winding 812 and a W-phase winding 813. The second winding set 802 is constituted of a U-phase winding 821, a V-phase winding 822 and a W-phase winding 823. Here, the inverter 601 provided for the first winding set 801 is referred to as a first power system inverter 601, and the inverter 602 provided for the second winding set 802 is referred to as a second power system inverter 602. In the following, a unit of combination of the inverter 601 or 602 and its associated three-phase winding set 801 or 802 is designated by "first power system" or "second power system".

The control section 10 includes a first power system power supply relay 421, a second power system power supply relay 422, a capacitor 43, the first power system and second power system inverters 601 and 602, first power system and second power system current detector sections 701 and 702 constituting the current detection section 70, the microcomputer 50 and the drive circuit 55. The current detector section 701 detects the phase currents supplied to the winding set 801 by the inverter 601. The current detector section 702 detects the phase currents supplied to the winding set 802 by the inverter 602.

A battery 41 is a 12V DC battery. The power supply relays 421 and 422, which serve as a power supply stop means, are capable of stopping supply of power from the battery 41 to each of the inverters 601 and 602. The capacitor 43, which is parallel-connected to the battery 41, is for storing charge to assist power supply to the inverters 601 and 602 and to suppress noise such as surge currents.

The first power system inverter 601 includes six switching elements 611 to 616 which are bridge-connected with one another for switching a current supply to among the phase windings 811 to 813 of the first power system winding set 801. In this embodiment, the switching elements 611 to 616 are MOSFETs. In the following, the switching elements 611 to 616 may be referred to as MCS 611 to 616, respectively.

The MOS 611 to 613 on the high potential side are connected to the positive terminal of the battery 41 at their drains, and respectively connected to the drains of the MOS 614 to 616 on the low potential side at their sources. The MOS 614 to 616 are connected to the negative terminal of the battery 41 at their sources through current detecting elements 711 to 713 constituting the current detector section 701, respectively. The connection nodes between the MOS 611 to 613 on the high potential side and the MOS 614 to 616 on the low potential side are connected to one ends of the phase windings 811 to 813, respectively. The current detecting elements 711 to 713 detect the phase currents supplied to the U-phase winding 811, V-phase winding 812 and W-phase winding 813 of the first power system winding set 801, respectively.

The second power system inverter 602 includes switching elements (MOSs) 621 to 626 and current detecting elements 721 to 723 constituting the second power system current detector section 702, which are connected with one another in the same way as the first power system inverter 601. The drive circuit 55 is connected to the gates of the MOSs 611-616 and 621-626 at its output terminals from which switching signals are outputted under control of the microcomputer 50.

Next, the operation of the electric power steering apparatus 100 having the above described structure is explained for the case where one of the first power system and second power system inverters 601 and 602 failed or one of the first power system and second power system winding sets 801 and 802 failed. First, the explanation is made for the case where the first power system inverter 601 or the first power system winding set 801 failed. More specifically, it is assumed that a short-circuit or wire breakage occurred in the MOS 611 to 616 constituting the first power system inverter 601, or in the first power system winding set 801.

In this case, the current detection value outputted from the first power system current detector section 701 become abnormal. Subsequently, the failure detection means 54 of the microcomputer 50 identifies that the first power system has failed based on the current detection value received from the current detection circuit 57. As a result, the control section 10 turns off the power supply relay 421 provided in the power supply line of the first power system inverter 601. Hence, it is possible to prevent excessive heat generation due to the short-circuit occurred in the first power system, for example.

The control section 10 continues to drive the motor 80 using only the second power system inverter 602 functioning normally after the detection of the failure in the first power system. At this time, the microcomputer 50 calculates and outputs an assist current command value appropriate for this state to the remaining normal second power system inverter 602. Next, the operation to calculate the assist current calculation value performed by the assist current calculation means 51 of the microcomputer 50 is explained with reference to FIGS. 4A to 4C.

It should be noted that the assist current calculation means 51 is means for calculating the assist current calculation value, and the assist current command means 52 determines the assist current command value to be outputted to the drive circuit 55 based on the assist current calculation. In this embodiment, the assist current command means 52 directly outputs the assist current calculation value to the drive circuit 55 as the assist current command value. Incidentally, in the other embodiments which are described later, the assist current command means 52 may be configured to select one of two assist current calculation values, or compensate the assist current command value before being outputted.

Prior to explaining the operation of the control section 10 when one of the first and second power systems is faulty, the operation of the control section 10 when both the first and second power systems are functioning normally is explained with reference to FIG. 4A. In this case, the assist current calculation means 51 calculates the assist current Ia based on the steering torque Ts and the vehicle speed using "a normal-state vehicle speed responsive map MR" shown in FIG. 4A. The normal-state vehicle speed responsive map MR, which is stored in the map storage means 53 of the microcomputer 50, defines a relationship between the steering torque Ts and the assist current Ia for each of predetermined typical vehicle speeds. This relationship may be referred to as "the T-I characteristic" hereinafter. In this embodiment, the T-I characteristic is shown for each of four typical vehicle speeds V0, V1, V2 and V3. For example, the typical vehicle speeds V0, V1, V2 and V3 are 0 km/h, 80 km/h, 120 km/h and 200 km/h, respectively.

Figure 4A:
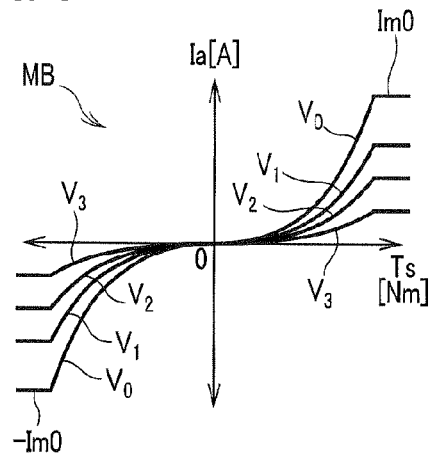
FIG. 4A is a diagram showing the content of a normal-state vehicle speed responsive map stored in and used by the electric power steering apparatus according to the first embodiment of the invention.

In the normal-state vehicle speed responsive map MR shown in FIG. 4A, the steering torque Ts is positive when the steering wheel 91 is turned in the clockwise direction from its neutral position, and negative when the steering wheel 91 is turned in the anticlockwise direction from its neutral position. Likewise, the assist current Ia is indicated by the positive sign when it is for causing the motor 80 to rotate in the direction to assist the steering torque Ts, and indicated by the negative sign when it is for causing the motor 80 to rotate in the direction to assist the steering torque Ts indicated by the negative sign.

In this normal-state vehicle speed responsive map MR, the T-I characteristic is symmetrical with respect to the origin point, and the assist current Ia varies within the range between −Im0 and Im0. In the following, the terms representing magnitude such as "large" and "small" make sense for the positive torque region where the steering torque is positive, and such terms are used for absolute magnitude for the negative torque region where the steering torque is negative. Accordingly, the term "current limit value" means a maximum current value or the current upper limit value Im0 for the positive-torque region, and means an absolute maximum current or the current lower limit value −Im0. The above applies to various maps described later.

As shown in FIG. 4A, the T-I characteristic is such that the assist current Ia increases parabolically with the increase of the steering torque Ts for each of the vehicle speeds, and becomes constant after reaching the current limit value set for each of the vehicle speeds. The assist torque Ts is set larger when the vehicle speed is smaller, and set smaller when the vehicle speed is larger for the same steering torque Ts. Accordingly, the steering wheel feels light and the maneuverability of the vehicle is improved when the vehicle is running at a low speed, because a large amount of the steering assist torque is provided. On the other hand, when the vehicle runs at a high speed, the running stability of the vehicle is improved because the steering assist torque is restricted so that the steering wheel feels heavy.

Next, the operation to calculate the assist current performed by the control section 10 when one of the first and second power systems is faulty is explained with reference to FIGS. 4B and 4C. When one of the first and second power systems has failed, if the remaining normal power system bears the whole of the assist currents which the first and second power systems had supplied until then, the remaining normal power system may be overloaded and generate excessive heat. To prevent such a problem, the assist current calculation means 51 calculates the assist current Ia using "a one power system failure-state map MA" different from the normal-state vehicle speed responsive map MR used in the normal state. The one power system failure-state map MA and later-described vehicle speed detection failure-state maps MB and MC do not necessarily have to be stored in the map storage means 51 in advance. They may be created temporarily by the assist current calculation means 51 at the time of calculating the assist current.

Figure 4B:
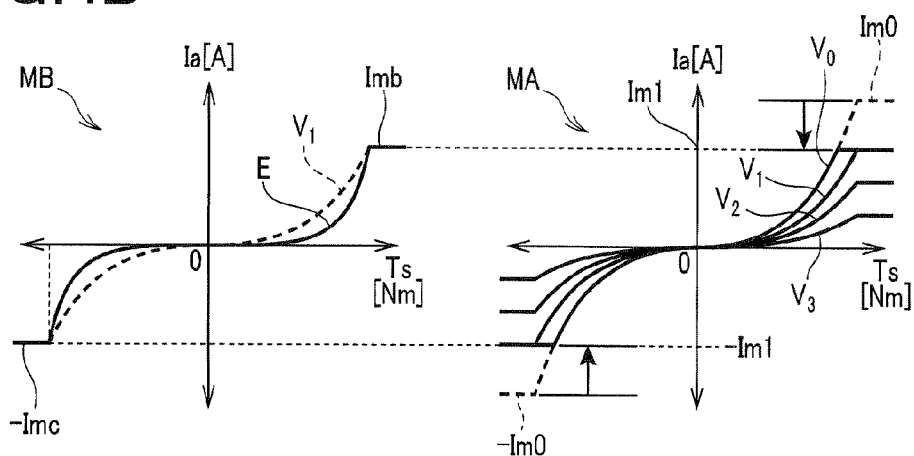
FIG. 4B is a diagram showing the content of a one power system failure-state map stored in and used by the electric power steering apparatus according to the first embodiment of the invention.
Figure 4C:
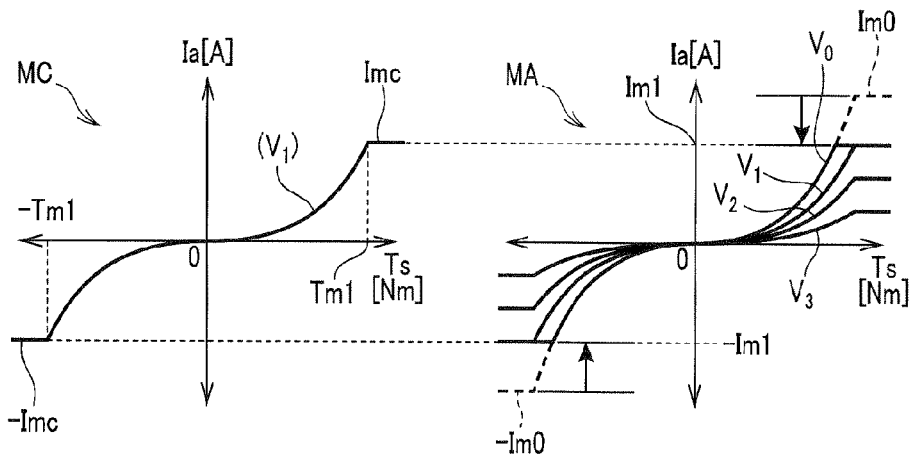
FIG. 4C is a diagram showing the content of another one power system failure-state map created and used by the electric power steering apparatus according to the first embodiment of the invention.

As shown in FIGS. 4B and 4C, one of a current limit value Imb set in the vehicle speed detection failure-state map MB and a current limit value Imc set in the vehicle speed detection failure-state map MC is set in the one power system failure-state map MA as "a first current limit value Im1". The T-I characteristic of the one power system failure-state map MA is the same as that of the normal-state vehicle speed responsive map MR for the torque region below the minimum value of the steering torque Ts corresponding to the first current limit value Im1.

The vehicle speed detection failure state-time maps MB and MC are maps used when the vehicle speed sensor 93 fails as a result of which the present vehicle speed Vp cannot be detected. The T-I characteristic E defined by the vehicle speed detection failure-state map MB shown in FIG. 4B is independent of the T-I characteristic defined by the normal-state vehicle speed responsive map MR, and is independent of the vehicle speed. As shown in FIG. 4B, the solid line showing the T-I characteristic E droops downward until the current limit value Imb is reached compared to the dotted line showing the T-I characteristic for the vehicle speed V1. The vehicle speed detection failure-state map MB may be referred to as "the independent-type vehicle speed detection failure-state map" hereinafter.

On the other hand, the T-I characteristic defined by the vehicle speed detection failure-state map MC shown in FIG. 4C is created by extracting a part of the T-I characteristic defined by the normal-state vehicle speed responsive map MR, which corresponds to a certain vehicle speed. In this embodiment, the part of the T-I characteristic corresponding to the vehicle speed V1 is extracted. The vehicle speed V1 may be referred to as "the provisional vehicle speed", and the vehicle speed detection failure-state map MC may be referred to as "the extraction-type vehicle speed detection failure-state map" hereinafter.

Figure 16:
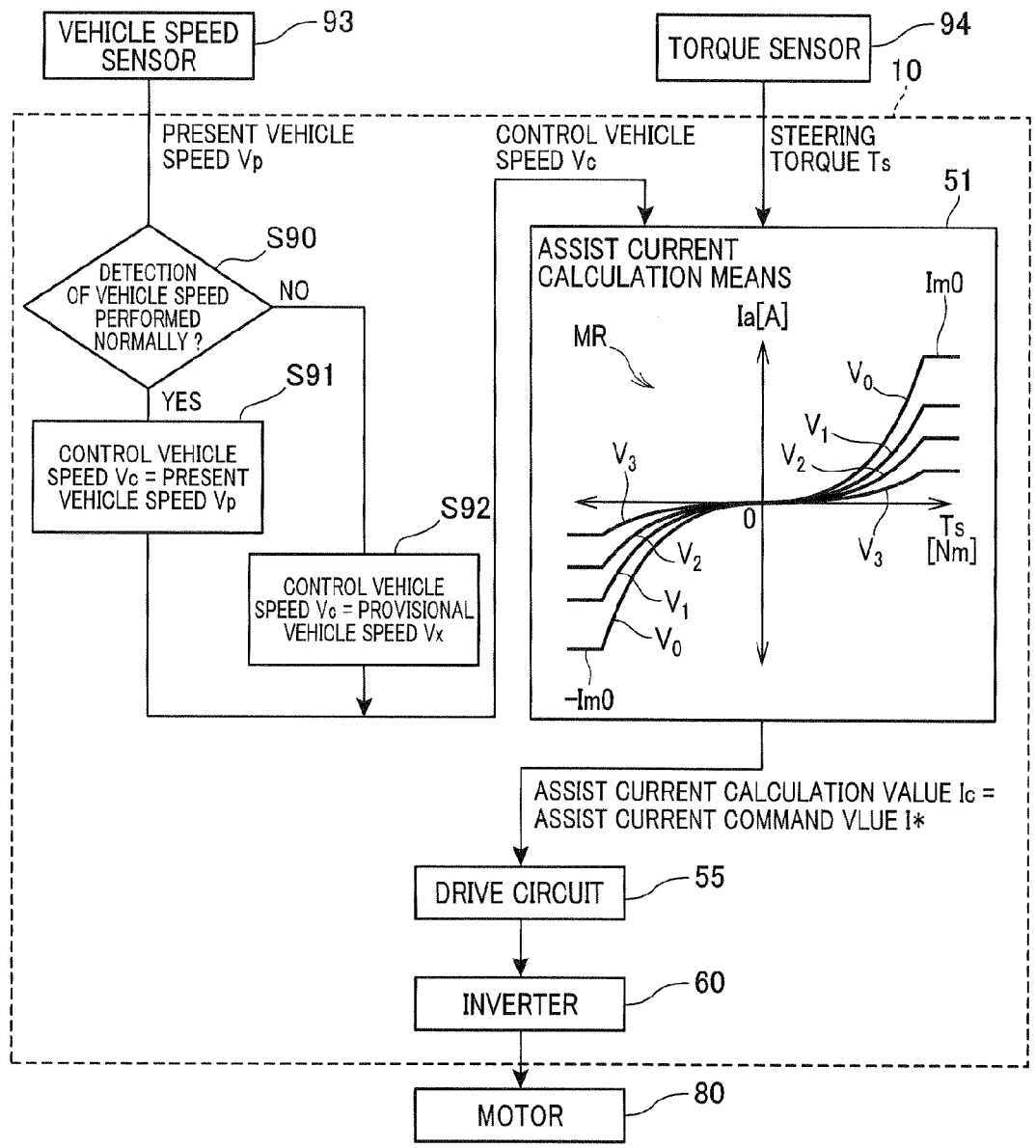
FIG. 16 is a diagram for explaining a conventional process for calculating an assist current when there is a failure in detecting a vehicle speed.

Here, the operation to calculate the assist current when there is a failure in detecting the vehicle speed, which is a known technique as described, for example, in Japanese Patent Application laid-open No. 2003-182616, is explained with reference to FIG. 16. As shown in the flowchart of FIG. 16, the operation begins in step S90 where the control section 10 determines whether or not detection of the vehicle speed is being normally performed by the vehicle speed sensor 93. If the determination result in step S90 is affirmative, the operation proceeds to step S91 where the present vehicle speed Vp detected by the vehicle speed sensor 93 is set as a control vehicle speed Vc. If the determination result in step S90 is negative, the operation proceeds to step S92 where the provisional vehicle speed Vx is set as the control speed Vc.

Thereafter, the assist current calculation means 51 calculates the assist current Ia corresponding to the control vehicle speed Vc using the normal-state vehicle speed responsive map MR. The assist current command means 52 outputs the assist current calculation value Ic to the drive circuit 55 as a assist current command value I*. In a case where there is a failure in detecting the vehicle speed, if the provisional vehicle speed Vx is equivalent to the vehicle speed V1, only the part of the T-I characteristic defined by the normal-state vehicle speed responsive map MR which corresponds to the vehicle speed V1 is used for the calculation. That is, the part extracted from the normal-state vehicle speed responsive map MR makes the vehicle speed detection failure-state map MC.

However, it is not appropriate to use the whole part of the vehicle speed detection failure-state map MB or MC for the case where the inverter apparatus or the winding set of one of the first and second power systems is faulty. For example, if the assist current Ia is calculated using the vehicle speed detection failure-state map MB or MC when the present vehicle speed Vp is smaller than the provisional vehicle speed Vx, since the value of assist current Ia becomes smaller than that in the normal state, the advantage of good maneuverability of the vehicle when running at a low speed may be lost. On the other hand, when the present vehicle speed Vp is larger than the provisional vehicle speed Vx, since the value of assist current Ia becomes larger than that in the normal time, the running stability of the vehicle when running at a high speed may be degraded.

Accordingly, in this embodiment, the first current limit value Im1 in the one power system failure-state map MA used by the assist current calculation means 51 is set equal to the current limit value Imb in the vehicle speed detection failure-state map MB or the current limit value Imc in the vehicle speed detection failure-state map MC. Hence, the one power system failure-state map MA used by the assist current calculation means 51 reflects the vehicle speed detection failure-state map MB or MC at least in the current limit value. The vehicle speed detection failure-state maps MB and MC are maps created for the purpose of ensuring a minimum level of the assist torque for any vehicle speed when the vehicle speed cannot be detected. Accordingly, by using such a map that reflects the current limit value of the vehicle speed detection failure-state map MB or MC, an appropriate level of the assist torque for the present vehicle speed can be ensured.

More specifically, since the assist current is more limited after the detection of the failure than before the detection of the failure, it is possible to prevent the remaining normal power system from being overloaded and excessive heat generation of the inverter apparatus 60 and the motor 80.

Commonly, the current limit values Imb and Imc of the vehicle speed detection failure-state maps MB and MC are set to the order of a half of the current limit value Imo set when both the first and second power systems are normal. If the current limit values Imb and Imc of the vehicle speed detection failure-state maps MB and MC are set equal to or smaller than a half of the current limit value Im set when both the first and second power systems are normal, the load of the remaining normal power system after the failure is kept equal to or below a half of that before the failure, and accordingly heat generation of the inverter set 60 and the motor 80 can be reliably suppressed. Incidentally, by making a slight modification to the drive circuit and discharging means, the current limit values Imb and Imc can be set only slightly larger than a half of the current limit value Im set when both the first and second power systems are normal.

In this embodiment, the T-I characteristic defined by the one power system failure-state map MA is the same as the T-I characteristic defined by the normal-state vehicle speed responsive map MR in the steering torque region below the minimum level of the steering torque Ts corresponding to the first current limit value Im1. Therefore, according to the first embodiment, it is possible to calculate, for the torque region where the load of the remaining normal power system does not matter, the assist current Ia in accordance with the vehicle speed in the same way as when both the first and second power systems are normal. Hence, according to this embodiment, even when one of the first and second power systems fails, the advantages of good maneuverability at a low vehicle speed and good running stability at a high vehicle speed can be ensured.

Second Embodiment

Next, a second embodiment of the invention is described with reference to FIGS. 5 and 6. The second embodiment differs from the first embodiment in the current limit value in the one power system failure-state map MA. First, "an assist-added steering torque", which is a feature of the second embodiment, is explained. Here, signs used in this embodiment are defined as follows.
Ts: steering torque [Nm]
Ta: assist torque [Nm]
Tsa: assist-added steering torque [Nm]
Ia: assist current [A]
η: efficiency [-] of the reduction gear 89
Z: reduction ratio [-] (=rotation speed of the motor 80/rotation speed of the steering shaft 92)
M: motor torque constant [Nm/A]
K: overall constant (=η×Z×M) [Nm/A]

The assist torque Ta and the assist-added steering torque Tsa are given by the following expressions (1) and (2), respectively.

$$Ta = \eta \times Z \times M \times Ia = K \times Ia \quad (1)$$

$$Tsa = Ts + Ta \quad (2)$$

The assist torque Ta is a torque which is generated by the motor 80, amplified by the reduction gear 89 and transmitted to the steering shaft 92. The assist-added steering torque Tsa is a torque equal to the sum of the steering torque Ts generated by the vehicle driver and the assist torque Ta.

Figure 5:
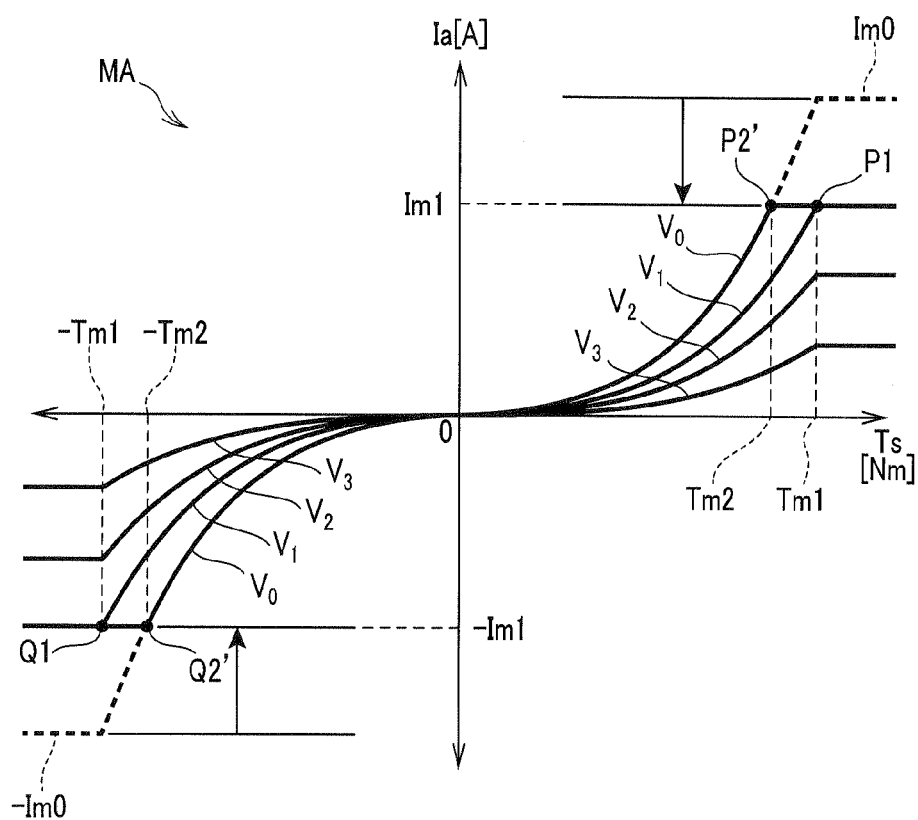
FIG. 5 is a diagram showing the content of the one power system failure-state map used by the electric power steering apparatus according to the first embodiment.
Figure 6:
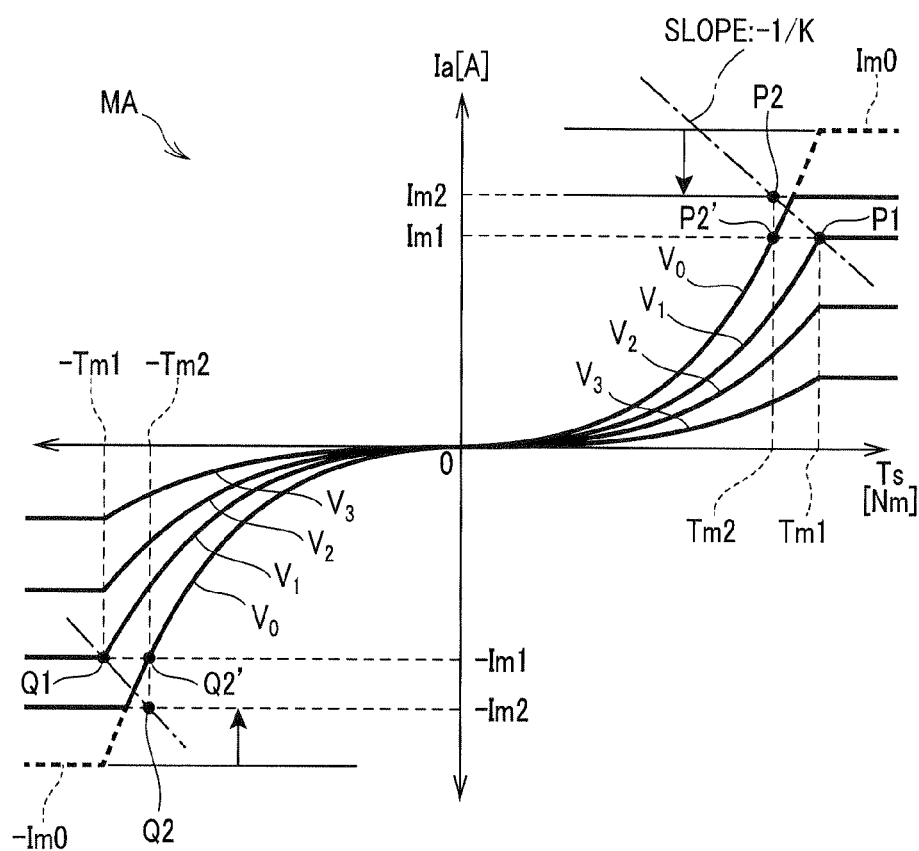
FIG. 6 is a diagram showing the content of a one power system failure-state map stored in and used by an electric power steering apparatus according to a second embodiment of the invention.

For comparison purposes, the one power system failure-state map MA used in the first embodiment is shown in FIG. 5. The first current limit value Im1, which is the current limit value Imb or Imc in the vehicle speed detection failure-time map MB or MC, is equivalent to the current limit value for the vehicle speed V1 in the normal-state vehicle speed responsive map MR. Accordingly, the current limit value is the same as that in the normal-state vehicle speed responsive map MR for each of the vehicle speeds V1, V2 and V3, however, the current limit value for the vehicle speed V0 decreases to the current limit value Im1 set for the vehicle speed V1.

Here, the minimum value of the steering torque corresponding to the current limit value Imb of Imc in the vehicle speed detection failure-state map MB or MC being referred to is designated as a steering torque Tm1. The steering torque Tm1 corresponds to the point P1 in FIG. 5. The point Q1 which is in the negative region of the steering torque Ts and symmetrical to the point P1 with respect to the origin point corresponds to a steering torque of −Tm1. In the negative region, the words the "minimum steering torque" means "steering torque which is minimum in absolute value". Since the above explanation for the positive region applies to the negative region, explanation for the negative region is omitted. A "maximum assist-added steering torque Tsa1" corresponding to the point P1 of the steering torque Tm1 and the vehicle speed V1 is given by the following expression (3) obtained by substituting Tm1 and Im1 into the expression (1)

$$Tsa1 = Tm1 + K \times Im1 \quad (3)$$

Further, the minimum value of the steering torque corresponding to the first current limit value Im1 in the one power system failure-state map MA is designated as a steering torque Tm2 The steering torque Tm2 corresponds to the point P2' in FIG. 5. A "maximum assist-added steering torque Tsa2'" corresponding to the point P2' of the steering torque Tm2 and the vehicle speed V0 is given by the following expression (4) obtained by substituting Tm2 and Im1 into the expression (1).

$$Tsa2' = Tm2 + K \times Im1 \quad (4)$$

Since Tm2<Tm1 as shown in FIG. 5, the relational expression of Tsa2'<Tsa1 is derived from the expressions (3) and (4). That is, the maximum assist-added steering torque Ts2' for the vehicle speed V0 calculated using the one power system failure-state map MA is smaller than the equivalent maximum assist-added steering torque Tsa1 calculated using the vehicle speed detection failure-state map MB or MC.

Accordingly, in the second embodiment, to compensate for the decrease of the maximum assist-added steering torque, the current limit value Im1 is shifted upward. As shown in FIG. 6, as a current limit value corresponding to the steering torque Tm2, a second current limit value Im2 is set (see the point P2). The second current limit value Im2 is calculated so that the maximum assist-added steering torque Tsa2 given by the expression (5) corresponding to the point P2 is equal to the maximum assist-added steering torque Tsa1 given by the expression (6) corresponding to the point P1.

$$Tsa2=Tm2+K\times Im2 \quad (5)$$

$$Tsa2=Tsa1=Tm1+K\times Im1 \quad (6)$$

Accordingly, the second current limit value Im2 is given by the following expression (7).

$$Im2=Im1+(Tm1-Tm2)/K \quad (7)$$

Hence, the slope of the straight line joining the point P2 and the point P1 is −1/K.

In the second embodiment, the second current limit value Im2 is set in the way described above, and the assist current limit value in the one power system failure-state map MA is changed from the first current limit value Im1 to the second current limit value Im2 to ensure the maximum assist-added steering torque necessary particularly in a low speed region. Hence, according to the second embodiment, the maneuverability of the vehicle can be further improved. Incidentally, in embodiments described below, the words "the first current limit value Im1" in the one power system failure-state map MA can be replaced by the words "the second current limit value Im2".

Third Embodiment

Next, a third embodiment of the invention is described with reference to FIGS. 7 and 8. The third embodiment is configured such that the control section 10 preforms a selection process in which an appropriate one of two assist current calculation values calculated by two assist current calculation means is selected. The two assist current calculation means do not necessary have to be two physically different calculation circuits. They may be implemented by a single calculation circuit capable of serving as either of two different calculating means.

Figure 7:
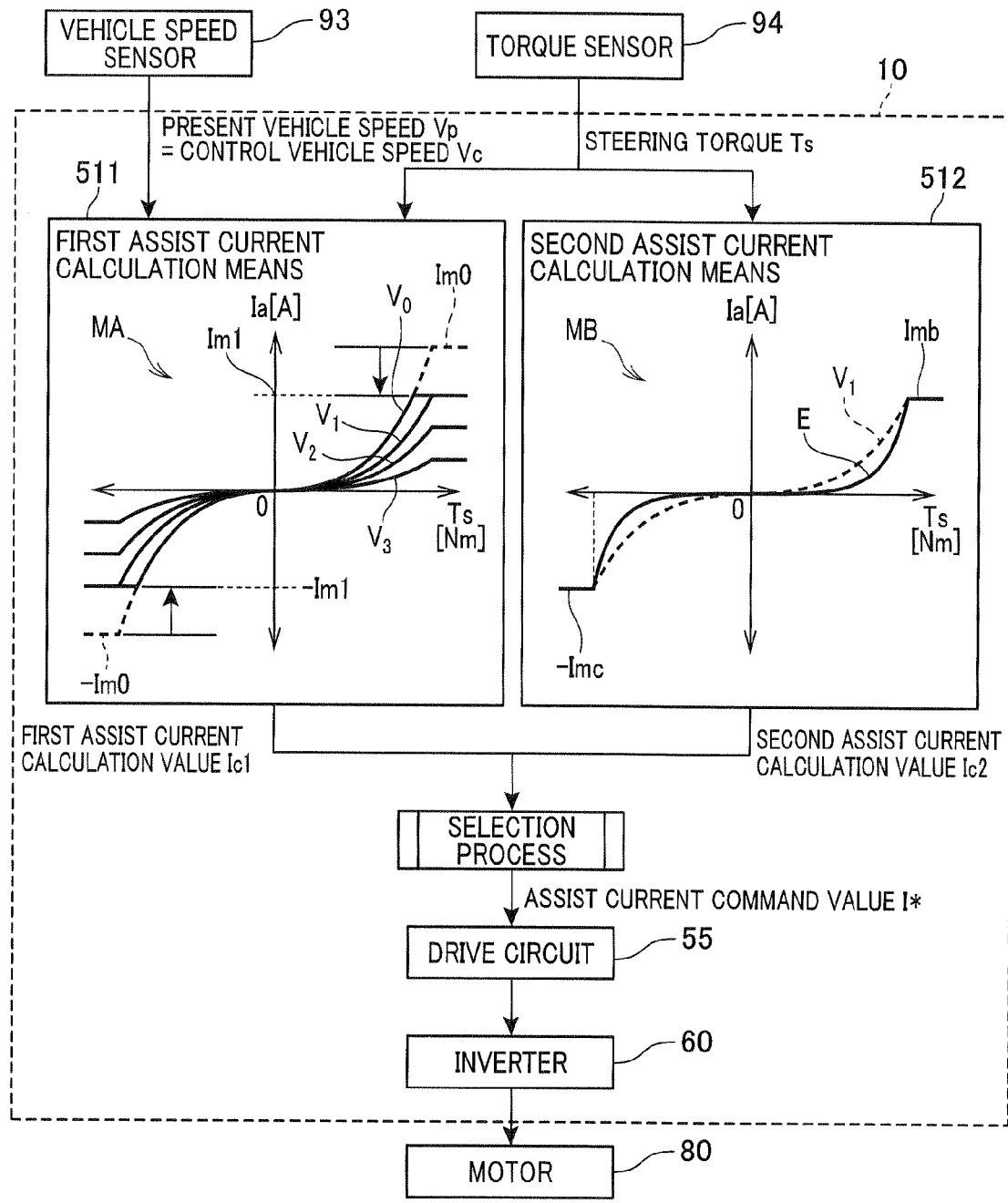
FIG. 7 is a block diagram of a control section of an electric power steering apparatus according to a third embodiment of the invention.
Figure 8:
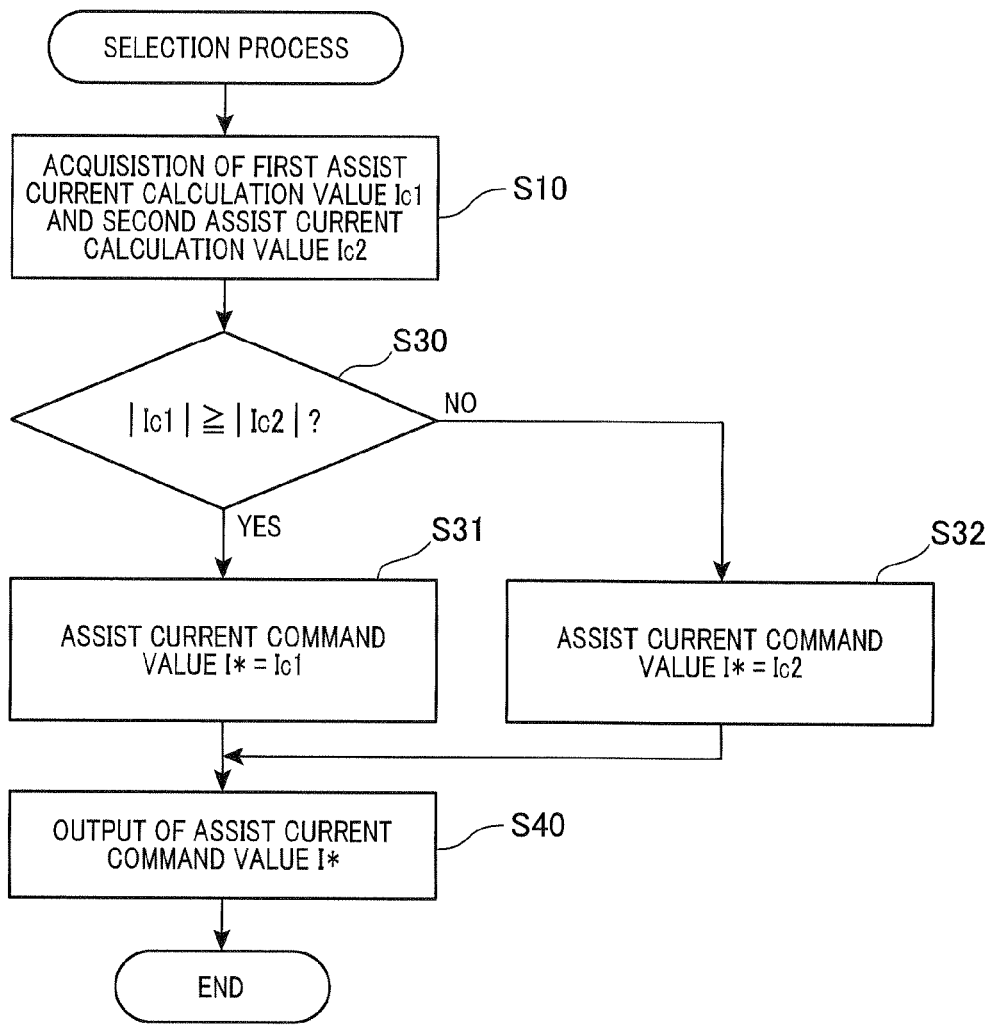
FIG. 8 is a flowchart showing steps of a selection process performed by the control section of the electric power steering apparatus according to the third embodiment of the invention.

In this embodiment, as shown in FIG. 7, the present vehicle speed Vp detected by the vehicle speed sensor 93 is inputted as the control vehicle speed Vc to a first assist current calculation means 511, and the steering torque Ts detected by the torque sensor 94 is inputted to the first assist current calculation means 511 and a second assist current calculation means 512.

The first assist current calculation means 511 calculates a first assist current calculation value Ic1 in accordance with the present vehicle speed Vp using the one power system failure-state map MA. The second assist current calculation means 512 calculates a second assist current calculation value Ic2 irrespective of the present vehicle speed Vp using the independent-type vehicle speed detection failure-state map MB. Instead of the independent-type vehicle speed detection failure-state map MB, the extraction-type vehicle speed detection failure-state map MC may be used. As described in the foregoing, the one power system failure-state map MA and the vehicle speed detection failure-state map MB or MC do not necessarily have to be stored in the map storage means in advance. They may be created temporarily by the assist current calculation means 511 or 512 at the time of calculating the assist current.

Next, the selection process is explained with reference to the flowchart of FIG. 8. This process begins in step S10 where the assist current command means 52 acquires the first assist current calculation value Ic1 and the second assist current calculation value Ic. In subsequent step S30, it is determined whether or not the absolute value of the first assist current calculation value Ic1 is larger than or equal to the absolute value of the second assist current calculation value Ic2. If the determination result in step S30 is affirmative, the process proceeds to step S31 where the first assist current calculation value Ic1 is set as the assist current command value I*, and then proceeds to step S40 to output the assist current command value I*. On the other hand, if the determination result in step S30 is negative, the process proceeds to step S32 where the second assist current calculation value Ic2 is set as the assist current command value I*, and then proceeds to step S40 to output the assist current command value I*.

Returning to FIG. 7, the assist current command value I* is inputted to the drive circuit 55. The inverter apparatus 60, which is controlled by the drive circuit 55, supplies power to the motor 80. In the third embodiment, the assist current command means 52 performs the selection process in which a larger one (in absolute value) of the first assist current calculation value Ic1 calculated by the first assist current calculation means 511 based on the one power system failure-state map MA and the second assist current calculation value Ic2 calculated by the second assist current calculation means 512 based on the vehicle speed detection failure-state map MB is selected as the assist current command value I*. Accordingly, according to the third embodiment, the maneuverability of the vehicle can be further improved.

Fourth Embodiment

Next, a fourth embodiment of the invention is described with reference to FIGS. 9 and 10. In the fourth embodiment, instead of the selection process as performed in the third embodiment, "a high speed-state vehicle speed responsive selection process" is performed.

Figure 9:
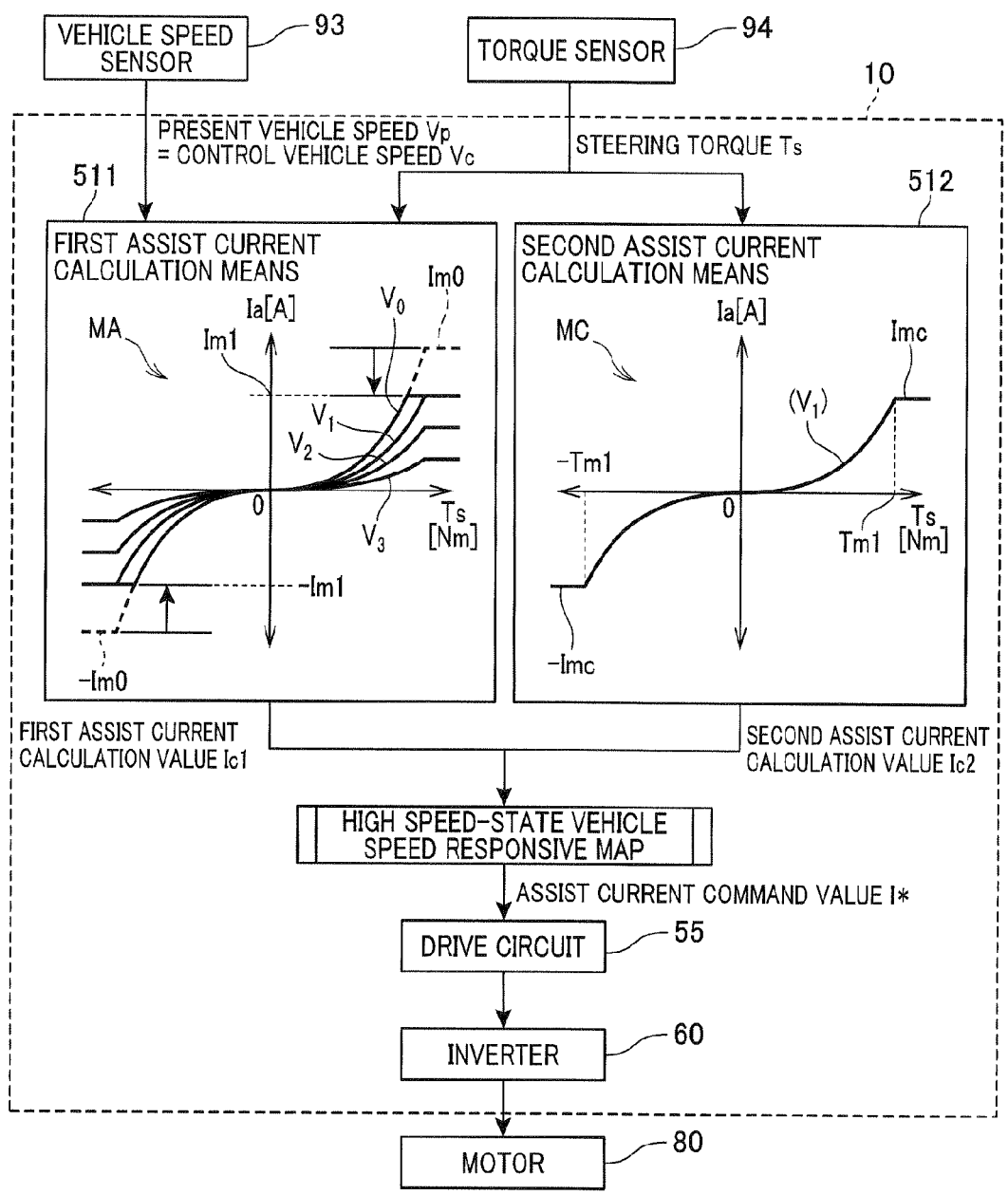
FIG. 9 is a block diagram of a control section of an electric power steering apparatus according to a fourth embodiment of the invention.
Figure 10:
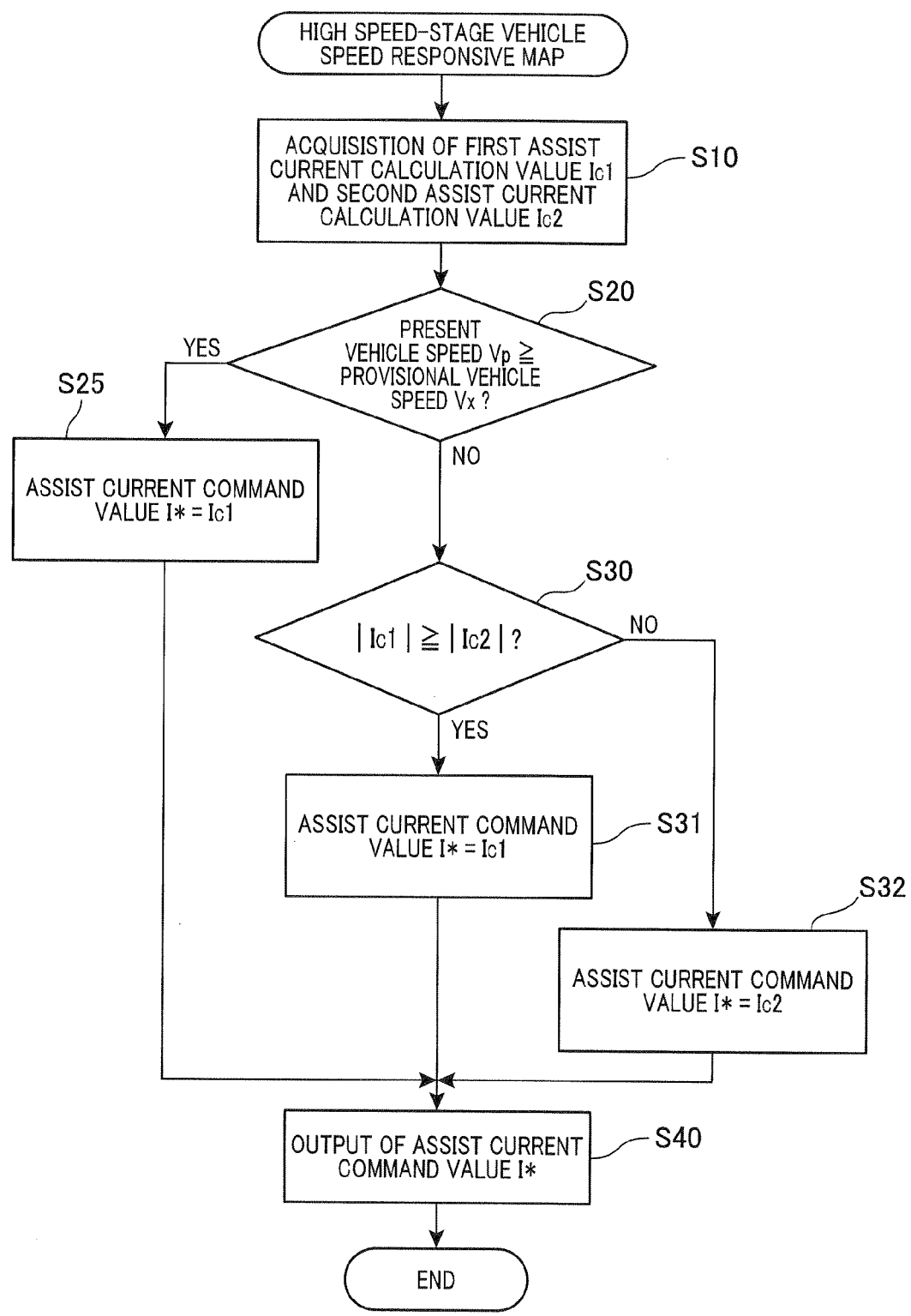
FIG. 10 is a flowchart showing steps of a high speed-state vehicle speed responsive selection process performed by the control section of the electric power steering apparatus according to the fourth embodiment of the invention.

The flowchart of FIG. 9 differs from the flowchart of FIG. 7 in that the second assist current calculation means 512 uses only the extraction-type vehicle speed detection failure-state map MC, and "SELECTION PROCESS" is changed to "HIGH SPEED-STATE VEHICLE SPEED RESPONSIVE SELECTION PROCESS". The provisional vehicle speed Vx in the vehicle speed detection failure-state map MC shown in FIG. 9 is equivalent to the vehicle speed V1. Incidentally, it is assumed here that the vehicle speed sensor 93 is normal, and the control vehicle speed Vc is equal to the present vehicle speed Vp.

Next, the high speed-state vehicle speed responsive selection process is explained with reference to the flow chart of FIG. 10. This process begins in step S10 where the first assist current calculation value Ic1 and the second assist current calculation value Ic2 are acquired, and then proceeds to step S20 to compare the present vehicle speed Vp with the provisional vehicle speed Vx in the vehicle speed detection failure-state map MC. If the determination result in step S20 is affirmative, the process proceeds to step S25 to set the first assist current calculation value Ic1 as the assist current command value I*, and then proceeds to step S40 to output the assist current command value I*. On the other hand, if the determination result in step S20 is negative, the process proceeds to step S30 to perform the selection process as described in the third embodiment, and then proceeds to step S40 to output the assist current command value I*.

In the fourth embodiment, the assist current command means 52 compares the present vehicle speed Vp detected by the vehicle speed sensor 93 with the provisional vehicle speed Vx prior to performing the selection process. If the present vehicle speed Vp is higher than the provisional vehicle speed Vx, the first assist current calculation value is set as the assist current command value. If the present vehicle speed Vp is lower than the provisional vehicle speed Vx, the selection process as described in the third embodiment is performed. Accordingly, in a high speed region where the present vehicle speed Vp is higher than the provisional vehicle speed Vx, the first assist current calculation value Ic1 based on the one power system failure-state map MA is used preferentially as the assist current command value I*. Hence, according to the fourth embodiment, since an appropriate amount of the assist torque can be ensured in the high speed region, the running stability of the vehicle is improved in the high speed region.

Fifth and Sixth Embodiments

Next, fifth and sixth embodiments of the invention are described with reference to FIGS. 11 to 14. The fifth and sixth embodiments are configured to perform "an assist current limiting process" in consideration of reduction of heat generation of the inverter apparatus 60 and the motor 80.

Figure 11:
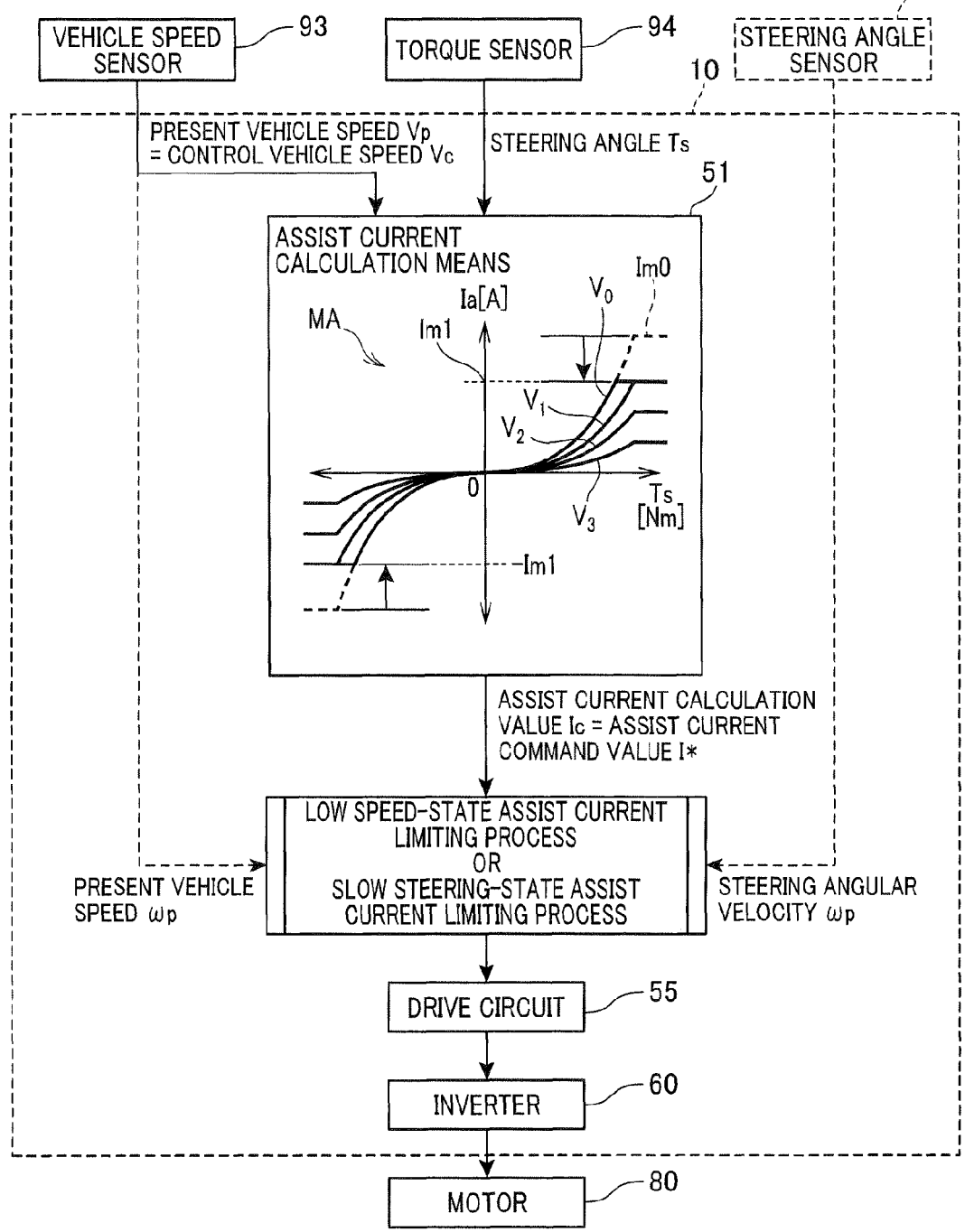
FIG. 11 is a block diagram of a control section of an electric power steering apparatus according to each of fifth and sixth embodiments of the invention.

As shown in FIG. 11, the assist current calculation means 51 calculates the assist current calculation value Ic in accordance with the present vehicle speed Vp based on the present vehicle speed Vp and the steering torque Ts using the one power system failure-state map MA. The fifth and sixth embodiments are the same as the first embodiment in this respect. In the fifth embodiment, the assist current command means 52 performs "a low vehicle speed-state assist current limiting process" on the acquired assist current command value I*. In the sixth embodiment, the assist current command means 52 performs "a slow steering wheel operating-state current limiting process" on the acquired assist current command value I*. Further, if the below-described condition is satisfied, a compensated version of the assist current command value I* is outputted to the drive circuit 55.

Figure 12:
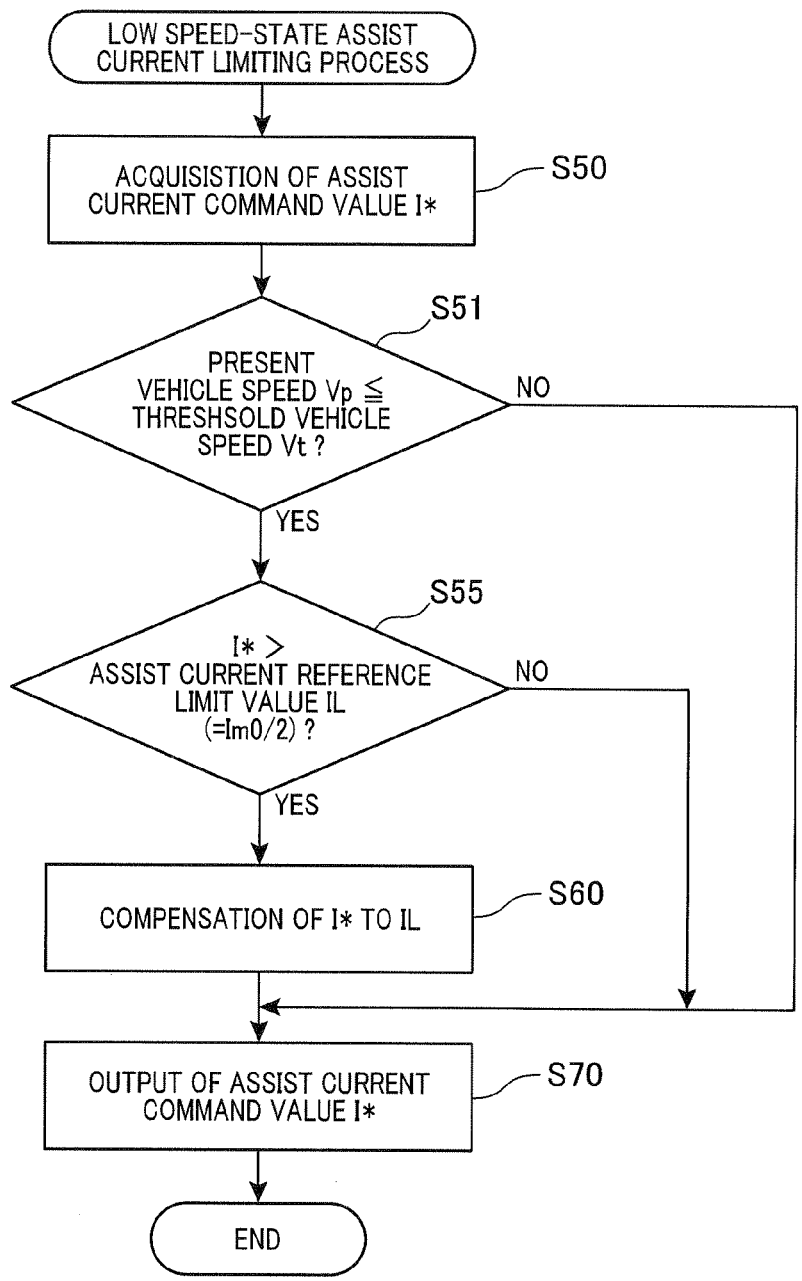
FIG. 12 is a flowchart showing steps of a low vehicle speed-state assist current limiting process performed by the control section of the electric power steering apparatus according to the fifth embodiment of the invention.

First, the low vehicle speed-state assist current limiting process performed in the fifth embodiment is explained with reference to the flowchart of FIG. 12. This process begins in step S50 to acquire the assist current command value I*, and then proceeds to step S51 to determine whether or not the present vehicle speed Vp is lower than or equal to a threshold vehicle speed Vt.

If the determination result in step S51 is affirmative, the process proceeds to step S55 to determine whether or not the assist current command value I* is larger than an assist current reference limit value IL. If the determination result in step S55 is affirmative, the process proceeds to step S60 to compensate the assist current command value I*, and then proceeds to step S70 to output the compensated assist current command value I*. If the determination result in step S51 is negative, or if the determination result in step S55 is negative, the process proceeds to step S70 to output the assist current command value I* as it is.

Figure 14:
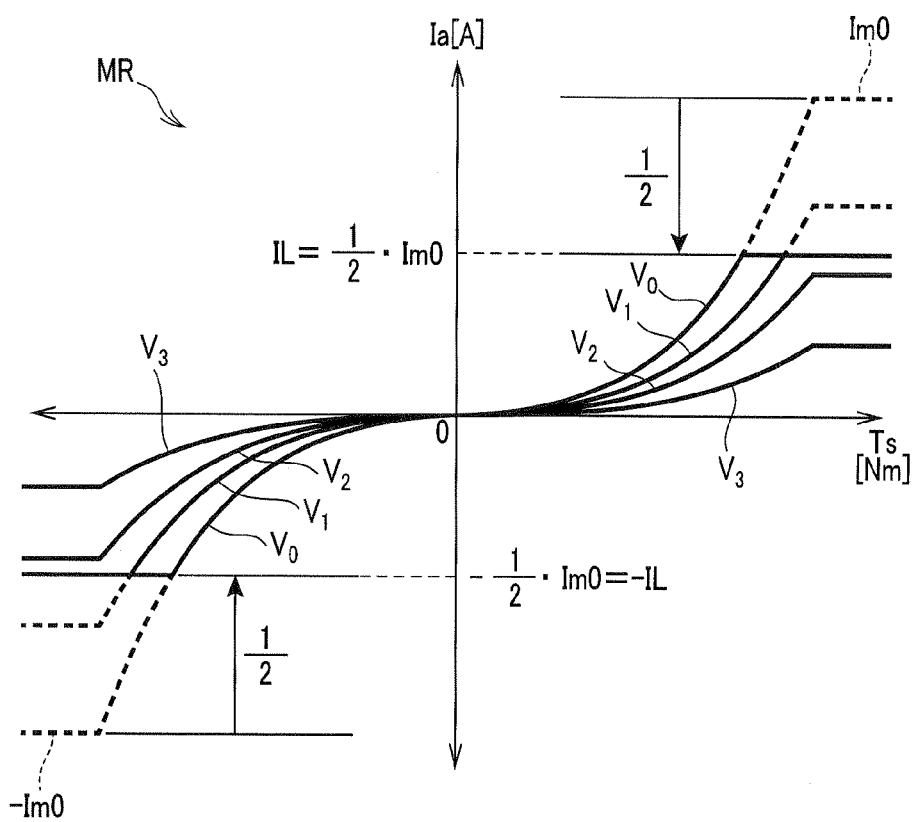
FIG. 14 is a diagram explaining how an assist current limit value is set by the dual-power system electric power steering apparatus according to the fifth embodiment when one of its two power systems fails.

As shown in FIG. 14, the assist current reference limit value IL is set to Im0/2 (a half the current limit value Im0) in the normal-state vehicle speed responsive map MR, that is, set to a value equivalent to the current limit value assigned per one of the two power systems before one of the two power systems fails. Accordingly, the inverter apparatus 60 and the motor 80 of the remaining normal power system can be prevented from being applied with an electric current load larger than the electric current load applied when both the two power systems are functioning normally. This makes it possible to prevent increase of heat generation of the inverter apparatus 60 and the motor 80 of the remaining normal power system when the vehicle is stopped or running at a low speed. Further, since an overheat protection device of the electric power steering system is unlikely to have to deal with abnormal high temperature by reducing heat generation of the inverter apparatus 60 and the motor 80, the electric power steering apparatus can continue to operate stably for a long time to provide a necessary steering assist torque.

Figure 13:
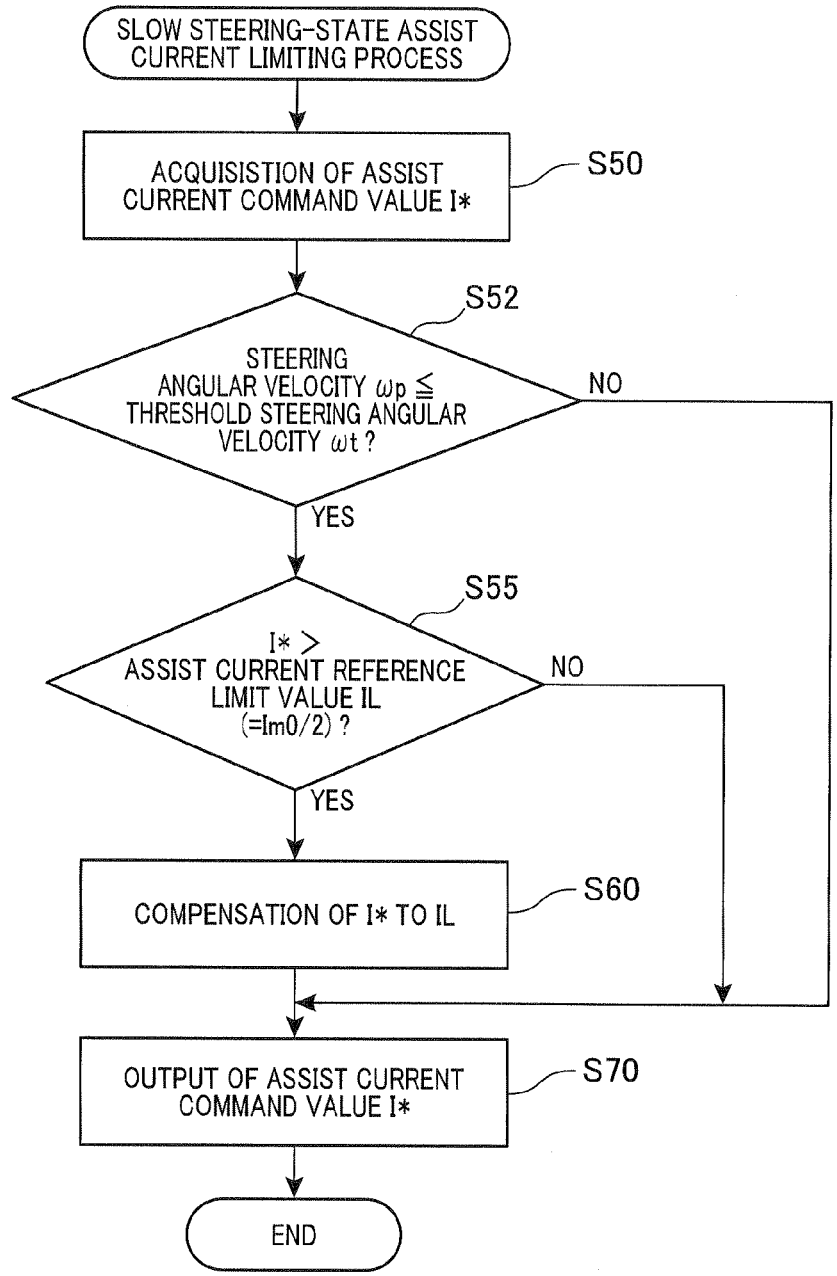
FIG. 13 is a flowchart showing steps of a slow steering-state assist current limiting process performed by the control section of the electric power steering apparatus according to the sixth embodiment of the invention.

Next, the slow steering wheel operating-state current limiting process performed in the sixth embodiment is explained with reference to the flowchart of FIG. 13. The flowchart shown in FIG. 13 is the same as the flowchart shown in FIG. 12 except that step S51 is replaced by step S52. In step S52, it is determined whether or not the steering angular velocity $\omega p$ detected by the steering angle sensor 95 is smaller than or equal to a threshold angular velocity $\omega t$. The steering angular velocity $\omega p$ may be detected from the output of the rotation angle sensor 85 instead of the output of the steering angle sensor 95.

From a practical standpoint, a large amount of the steering assist torque is needed at the time of quickly turning the steering wheel to escape from an emergency situation. On the other hand, when the steering wheel is operated slowly, only a small amount of the steering assist torque is needed. Accordingly, by limiting the assist current command value within the assist current reference limit value when the steering wheel is operated slowly, heat generation of the inverter apparatus 60 and the motor 80 can be reduced. Hence, according to the sixth embodiment, the electric power steering apparatus can continue to operate steadily for a long time to provide a necessary amount of the steering assist torque as is the case with the fifth embodiment.

The sixth embodiment may be combined with the fifth embodiment so that the assist current command means 52 performs the assist current limiting process when the present vehicle speed Vp is lower than or equal to the threshold vehicle speed Vt, and the steering angular velocity $\omega p$ is lower than or equal to the threshold steering angular velocity $\omega t$.

Seventh Embodiment

Figure 15:
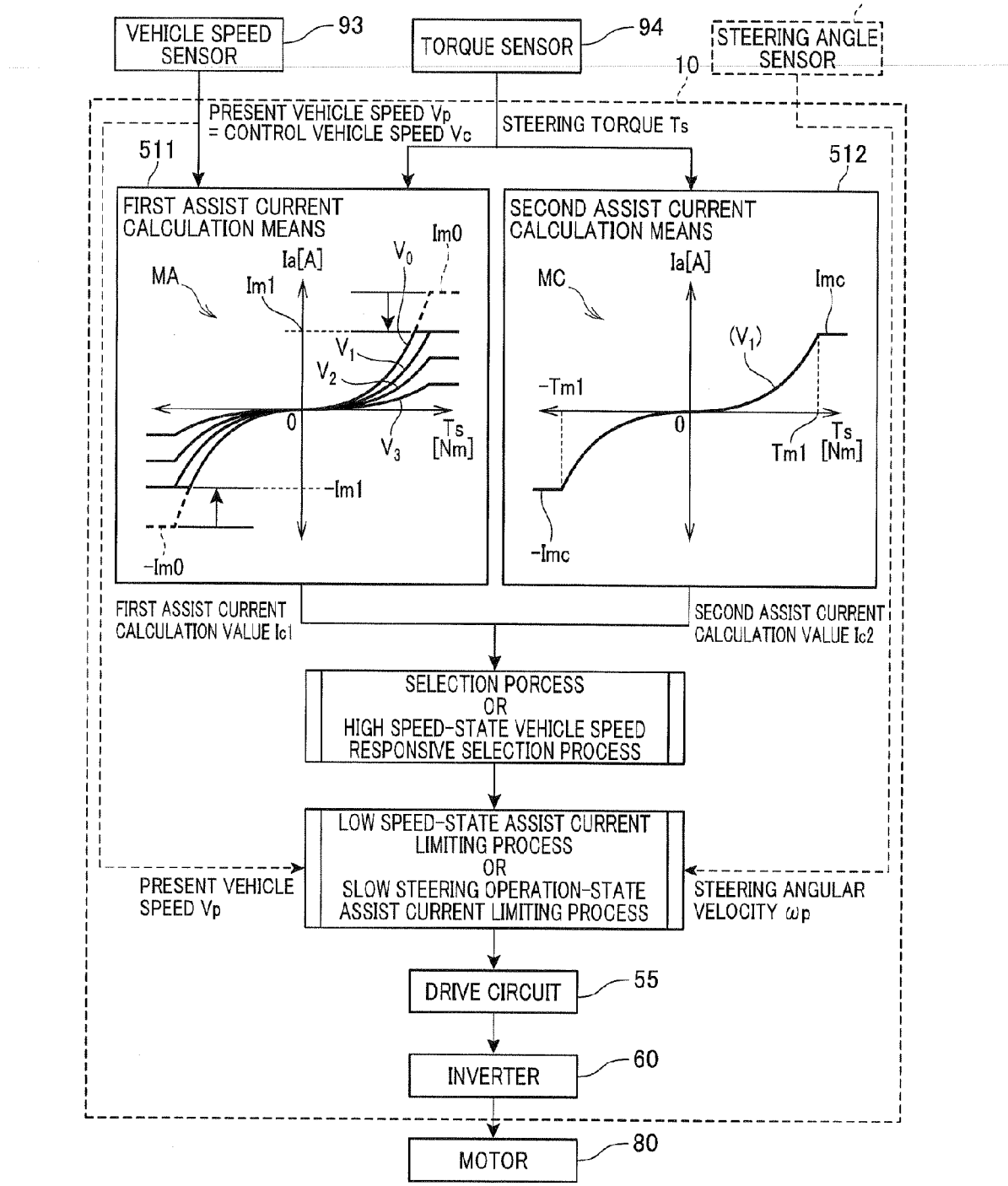
FIG. 15 is a block diagram of a control section of an electric power steering apparatus according to a seventh embodiment of the invention.

Next, a seventh embodiment of the invention is described with reference to FIG. 15. The seventh embodiment is a combination of the third or fourth embodiment and the fifth or sixth embodiment. That is, in the seventh embodiment, the assist current command means 52 performs the selection process or the high speed-state vehicle speed responsive selection process in the first half, and performs the low vehicle speed-state assist current limiting process or the slow steering wheel operating-state current limiting process in the second half. According to the seventh embodiment, the various processes can be combined to provide the steering assist torque optimally depending on the vehicle speed.

Other Embodiments (1) The electric power steering apparatus according to each of the above embodiments has the two power systems which include the combination of the inverter apparatus 601 and the wiring set 801 and the combination of the inverter apparatus 602 and the wiring set 802, respectively. When one of the two power systems fails, the remaining normal power system operates to drive the motor 80. However, the electric power steering apparatus may have N (N being an integer equal to three or more) power systems each including the inverter apparatus and the wiring set. In this case, when one of the N power systems fails, the remaining normal (N−1) power systems drive the motor 80 in the way described in any one of the embodiments described above. In this case, the words "assist current reference limit value IL" in the fifth to eighth embodiments are replaced by the words "(N−1)/N of the current limit value Im0 in the normal state".

(2) The means for stopping supply of power to the inverter of the failed power system does not necessarily have to be constituted of the power supply relays 421 and 422. For example, this means may be implemented by the microcomputer 50 configured to set the assist current command value to be outputted to the failed power system to 0.

(3) The power converter is not limited to an inverter. For example, it may be a DC/DC converter. The motor 80 may be a motor other than a brushless motor.

The above explained preferred embodiments are exemplary of the invention of the present application which is described solely by the claims appended below. It should be understood that modifications of the preferred embodiments may be made as would occur to one of skill in the art.

What is claimed is:

1. An electric power steering apparatus comprising:
a vehicle speed sensor for detecting a vehicle speed;
a torque sensor for detecting a steering torque by a vehicle driver;
a motor having a plurality of wiring sets and outputting torque when supplied with power;
a reduction gear for transmitting output torque of the motor to a steering shaft as an assist torque, while amplifying the output torque of the motor and reducing output rotation of the motor; and
a control section for controlling rotation of the motor;
wherein the control section includes:
a plurality of systems of power converter apparatuses provided corresponding to the plurality of the winding sets for supplying power to the motor;
a drive circuit for driving the power converter apparatuses in accordance with a commanded assist current;
a failure detection means for detecting a failure in the power converter apparatus or the winding set of any one of the plurality of the systems;
a power supply stopping means for stopping supply of power to the power converter apparatus of the failed power system detected by the failure detection means;
a map storage means for storing at least a normal-state vehicle speed responsive map defining a T-I characteristic of a relationship between the steering torque and the assist current, the normal-state vehicle speed responsive map being used to determine the T-I characteristic in accordance with the vehicle speed when the vehicle speed is normally detected by the vehicle speed sensor;
an assist current calculation means for calculating the assist current based on the steering torque detected by the torque sensor and the vehicle speed detected by the vehicle speed sensor, the assist current calculation means being configured to, when a failure is detected by the failure detection means, set a first current limit value as an assist current limit value in a one-system failure-state map to be used for the power converter apparatus of each normal system except the failed system equal to an assist current limit value in a vehicle speed detection failure-state map to be used when there is a failure in detecting the vehicle speed by the vehicle speed sensor, the vehicle speed detection failure-state map defining the T-I characteristic independently of the vehicle speed; and
an assist current command means for commanding an assist current command value to the drive circuit based on the assist current calculated by the assist current calculation means.

2. The electric power steering apparatus according to claim 1, wherein
when the first current limit value is Im1, a minimum value of the steering torque corresponding to the assist current limit value in the vehicle speed detection failure-state map is Tm1, a minimum value of the steering torque corresponding to the first current limit value in the one-system failure-state map is Tm2, and a constant depending on characteristics of the motor and the reduction gear is K,
the assist current calculation means sets a second current limit value given by an expression of Im2=Im1+(Tm1−Tm2)/K, and sets the assist current limit value in the one-system failure-state map to the second current limit value instead of the first current limit value.

3. The electric power steering apparatus according to claim 1, wherein the T-I characteristic in the one-system failure-state map is the same as the T-I characteristic in the normal-state vehicle speed responsive map for a steering torque region below the minimum value of the steering torque corresponding to the first or second current limit value.

4. The electric power steering apparatus according to claim 3,
wherein
the control section includes a first assist current calculation means and a second assist current calculation means for calculating the assist current to be supplied to the normal system when a failure is detected by the failure detection means, the first assist current calculation means calculating the assist current using the one-system failure-state map, the second assist current calculation means calculating the assist current using the vehicle speed detection failure-state map, and
the assist current command means performs a selection process in which a lager one in absolute value of a first assist current calculation value by the first assist current calculation means and a second assist current calculation value by the second assist current calculation means is selected and set as the assist current command value.

5. The electric power steering apparatus according to claim 4, wherein
the vehicle speed detection failure-state map used by the second assist current calculation means is a map created by extracting a part of the T-I characteristic defined by the normal-stage vehicle speed responsive map for a predetermined provisional vehicle speed, and
the assist current command means compares a present vehicle speed detected by the vehicle speed sensor with the provisional vehicle speed prior to performing the selection process, sets the first assist current calculation value as the assist current command value if the present vehicle speed is higher than or equal to the provisional vehicle speed, and performs the selection process if the present vehicle speed is lower than the provisional vehicle speed.

6. The electric power steering apparatus according to claim 3, wherein, when one of the N (N being an integer equal to 2 or more) systems of the power converter apparatuses or the corresponding winding sets is detected to be failed by the failure detection means,
if the present vehicle speed is lower than or equal to a predetermined threshold vehicle speed and the commanded assist current command value exceeds an assist current reference limit value equivalent to (N−1)/N of the assist current limit value in the normal-state vehicle speed responsive map, the assist current command means compensates the assist current command value to the assist current reference limit value.

7. The electric power steering apparatus according to claim 3, wherein, when one of the N (N being an integer equal to 2 or more) systems of the power converter apparatuses or the corresponding winding sets is detected to be failed by the failure detection means, if a steering angular velocity of the steering shaft is smaller than or equal to a predetermined threshold steering angular velocity and the commanded assist current command value exceeds an assist current reference limit value equivalent to $(N-1)/N$ of the assist current limit value in the normal-state vehicle speed responsive map, the assist current command means compensates the assist current command value to the assist current reference limit value.

* * * * *